(12) United States Patent
Yu et al.

(10) Patent No.: US 8,365,590 B2
(45) Date of Patent: Feb. 5, 2013

(54) TERMINAL ENCAPSULATED TIRE MONITORING DEVICE

(75) Inventors: San-Chuan Yu, Changhua County (TW); Ting-Chun Chien, Changhua County (TW)

(73) Assignee: Cub Elecparts Inc., Fusing Township, Changhua County (TW)

( * ) Notice: Subject to any disclaimer, the term of this patent is extended or adjusted under 35 U.S.C. 154(b) by 194 days.

(21) Appl. No.: 13/040,924

(22) Filed: Mar. 4, 2011

(65) Prior Publication Data

US 2012/0222477 A1 Sep. 6, 2012

(51) Int. Cl.
*B60C 23/02* (2006.01)
(52) U.S. Cl. ........................................................ 73/146.5
(58) Field of Classification Search .......... 73/146–146.8
See application file for complete search history.

(56) References Cited

U.S. PATENT DOCUMENTS

| | | | | |
|---|---|---|---|---|
| 4,011,309 | A * | 3/1977 | Lutz | 424/49 |
| 5,452,608 | A * | 9/1995 | Green | 73/146.8 |
| 7,578,180 | B2 * | 8/2009 | Lionetti et al. | 73/146 |
| 2012/0267988 | A1 * | 10/2012 | Hassel | 310/68 B |

* cited by examiner

*Primary Examiner* — Andre Allen
(74) *Attorney, Agent, or Firm* — Muncy, Geissler, Olds & Lowe, PLLC

(57) ABSTRACT

A terminal encapsulated tire monitoring device electrically connectable with at least one contact of a read-write tool is disclosed to include a housing, a sensor unit mounted in the housing and consisting of a circuit board and a plurality of terminal connection portions, a plurality of conducting terminals partially embedded in the housing each having a first contact end electrically connectable by one contact of the read-write tool and a second contact end electrically connected to one terminal connection portion of the sensor unit.

10 Claims, 8 Drawing Sheets

TERMINAL ENCAPSULATED TIRE MONITORING DEVICE

BACKGROUND OF THE INVENTION

1. Field of the Invention

The present invention relates to tire monitoring technology and more particularly, to a terminal encapsulated tire monitoring device.

2. Description of the Related Art

Conventional tire monitoring devices include two types, namely, the wireless parameter writing type and the wired parameter writing type. In a wired parameter writing type, the conducting terminals are soldered to a circuit board, and the housing provides one access hole through which a writing tool is electrically connectable to the conducting terminals for transmitting data.

As the conducting terminals of a wired parameter writing type are directly soldered to the circuit board and suspending in the housing, the conducting terminals tend to be vibrated or biased. After a long use, the conducting terminals may be loosened or disconnected from the circuit board, causing conducting failure. Support means may be added to hold the conducting terminals in position. However, the use of support means complicates the design, occupies much the internal space, requires much labor and time and increases the manufacturing cost.

Therefore, it is desirable to provide a tire monitoring device, which eliminates the drawbacks of the conventional designs and facilitates data access.

SUMMARY OF THE INVENTION

The present invention has been accomplished under the circumstances in view. It is the main object of the present invention to provide a terminal encapsulated tire monitoring device, which assures positive positioning of conducting terminals with a housing and a circuit board, avoiding vibration loosening or contact failure and, which has a compact component design to minimize the device dimension and to provide extra accommodation space, facilitating fabrication and installation.

To achieve this and other objects of the present invention, a terminal encapsulated tire monitoring device is electrically connectable with at least one contact of a read-write tool, comprising a housing, a sensor unit mounted in the housing and consisting of a circuit board and a plurality of terminal connection portions, a plurality of conducting terminals partially embedded in the housing each having a first contact end electrically connectable by one contact of the read-write tool and a second contact end electrically connected to one terminal connection portion of the sensor unit.

BRIEF DESCRIPTION OF THE DRAWINGS

Other features and advantages of the present invention will be understood by reference to the following specification in conjunction with the accompanying drawings, which like reference signs denote like elements of the structure.

DETAILED DESCRIPTION OF THE INVENTION

Figure 1:
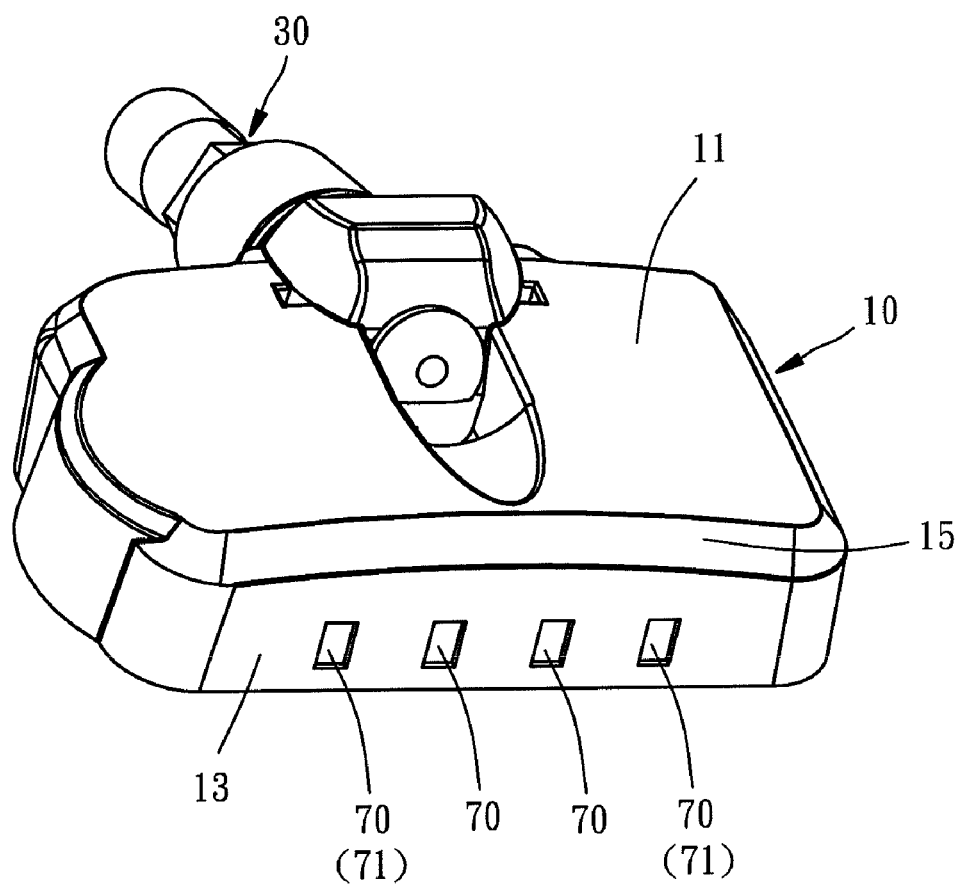
FIG. 1 is an oblique top elevational view of a terminal encapsulated tire monitoring device in accordance with a first embodiment of the present invention.
Figure 2:
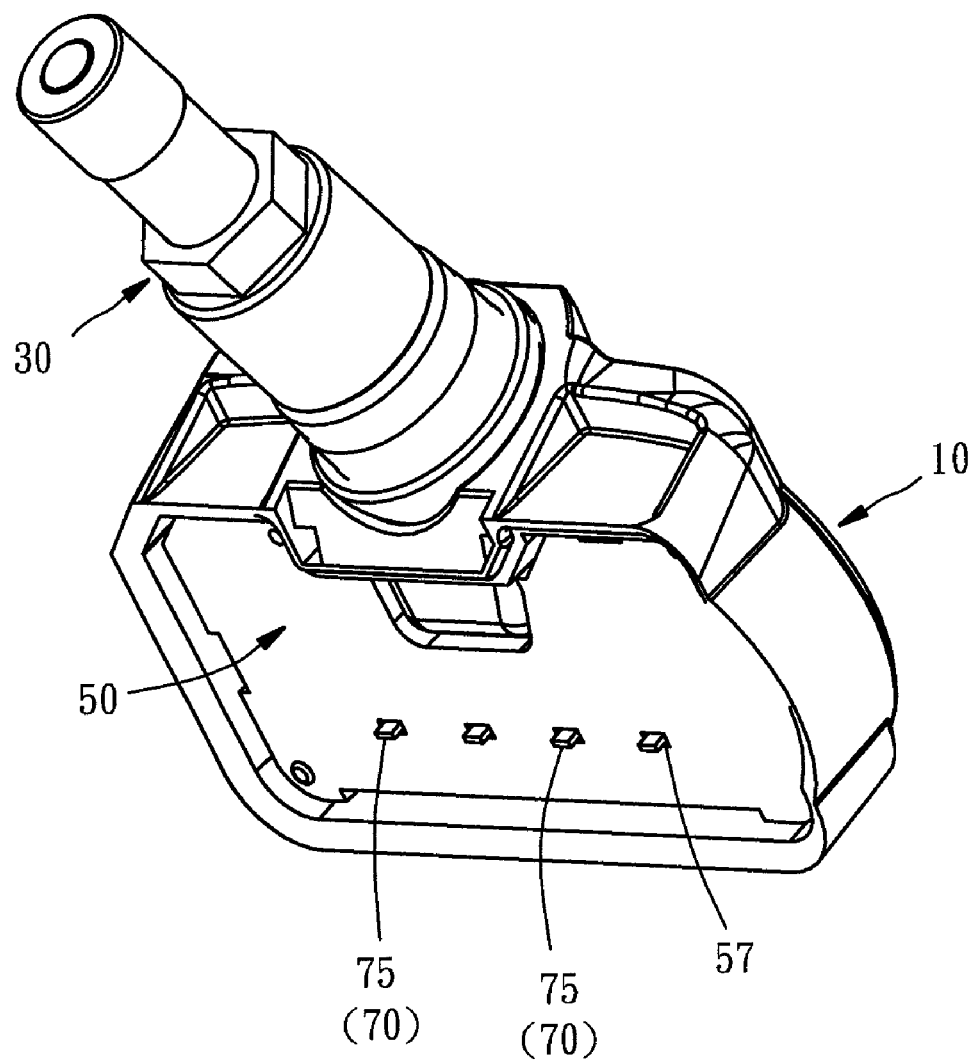
FIG. 2 is an oblique bottom elevational view of the terminal encapsulated tire monitoring device in accordance with the first embodiment of the present invention.
Figure 3:
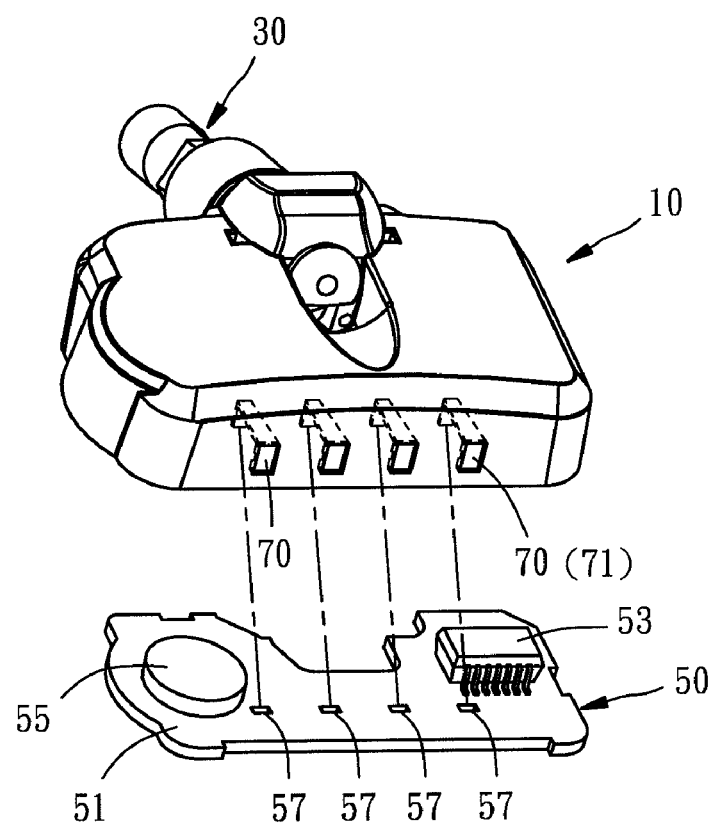
FIG. 3 is an exploded view of the terminal encapsulated tire monitoring device in accordance with the first embodiment of the present invention.
Figure 4:
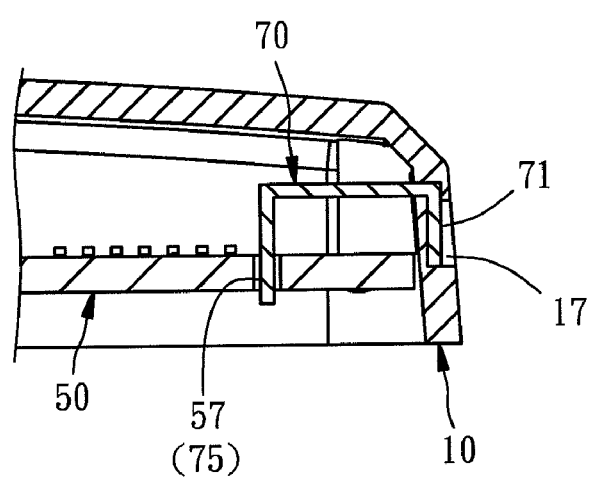
FIG. 4 is a sectional view of a part of the terminal encapsulated tire monitoring device in accordance with the first embodiment of the present invention.

Referring to FIGS. 1~4, a terminal encapsulated tire monitoring device in accordance with a first embodiment of the present invention is electrically connectable with one or multiple contacts (not shown) of a read write tool (not shown). The terminal encapsulated tire monitoring device comprises a housing (not marked with a number), an air valve 30, a sensor unit 50 and a plurality of conducting terminals 70.

The housing comprises a first shell member 10. The first shell member 10 comprises a top wall 11, a peripheral wall 13 and a corner edge 15. Further, the housing is made of plastics or rubber by means of injection molding.

The air valve 30 is mounted in the aforesaid housing and adapted for inflating a vehicle tire. According to this embodiment, the air valve 30 can be embedded in the housing, or affixed to the housing by means of any other fixation method.

The sensor unit 50 is mounted in the aforesaid housing, comprising a circuit board 51, a controller 53, a battery 55 and a plurality of terminal connection portions 57 located on the circuit board 51. The sensor unit 50 has multiple functions in setting programs, sensing different items and transmitting data.

The conducting terminals 70 are configured into U-shape and arranged in a row and partially embedded in the aforesaid housing, each having a first contact end 71 for the contact of one respective contact of a read-write tool electrically and a second contact end 75 electrically connected to one respective terminal connection portion 57 of the sensor unit 50. According to this embodiment, the second contact end 75 inserted into one respective terminal connection portion (via hole) 57 of the sensor unit 50 and electrically soldered thereto. Further, the part of each conducting terminal 70 that is embedded in the housing has a rough surface.

As stated above, the conducting terminals 70 are partially embedded in the aforesaid housing. The housing has a plurality of holes 17 respectively disposed corresponding to the first contact ends 71 of the conducting terminals 70 for the insertion of the respective contacts of a read-write tool into contact with the respective first contact ends 71 of the conducting terminals 70. According to this embodiment, the conducting terminals 70 are partially embedded in the peripheral wall 13 of the housing.

The operation and effects of the terminal encapsulated tire monitoring device will be explained hereinafter:

Referring to FIGS. 1~4 again, the conducting terminals 70 are put in the mold before injection-molding of the housing, and therefore the conducting terminals 70 are partially embedded in the housing after molding. Thus, the conducting terminals 70 are tightly affixed to the housing, avoiding vibration or contact failure, and demonstrating a significant improvement over the prior art designs.

Thus, the contacts of a read-write tool can be respectively electrically connected to the first contact ends 71 of the conducting terminals 70 to form a loop for enabling the read-write tool to read in data from the sensor unit 50 or to write data into the sensor unit 50, performing setting or operation of the sensor unit 50. After removal of the read-write tool from the first contact ends 71 of the conducting terminals 70, the circuit is opened again.

Figure 5:
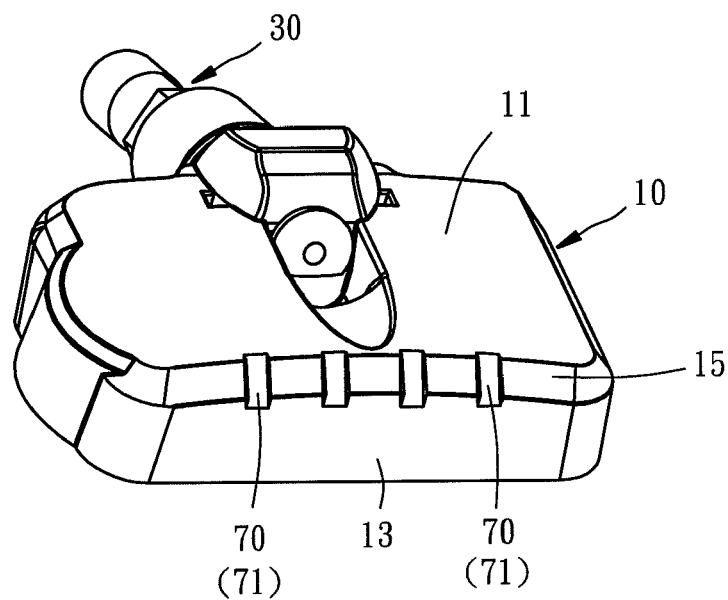
FIG. 5 is an oblique top elevational view of a terminal encapsulated tire monitoring device in accordance with a second embodiment of the present invention.
Figure 6:
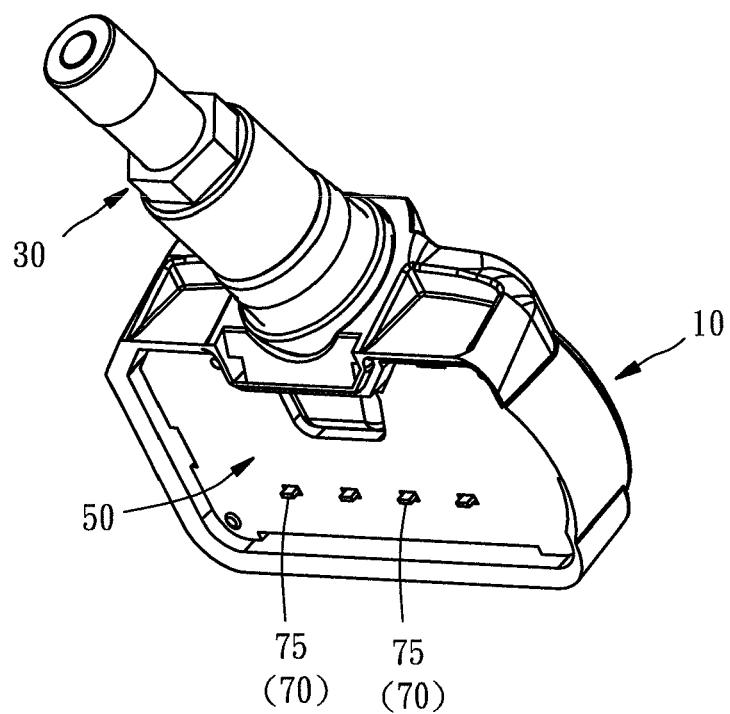
FIG. 6 is an oblique bottom elevational view of the terminal encapsulated tire monitoring device in accordance with the second embodiment of the present invention.
Figure 7:
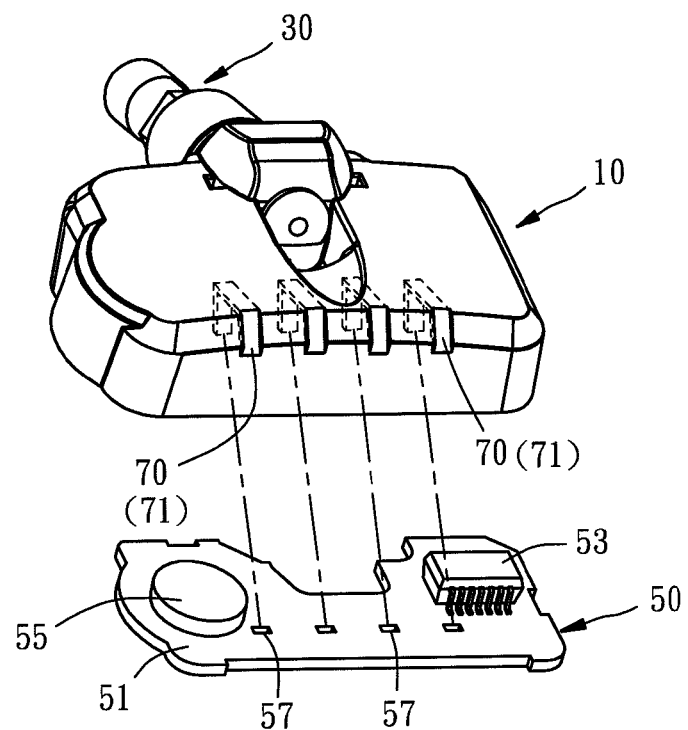
FIG. 7 is an exploded view of the terminal encapsulated tire monitoring device in accordance with the second embodiment of the present invention.

FIGS. 5~7 illustrate a terminal encapsulated tire monitoring device in accordance with a second embodiment of the present invention. Similar to the aforesaid first embodiment, the terminal encapsulated tire monitoring device in accordance with this second embodiment consists of a housing, an air valve 30, a sensor unit 50 and a set of conducting terminals 70. The main feature of this second embodiment is that the first contact end 71 of each conducting terminals 70 is disposed in the corner edge 15 of the housing.

Figure 8:
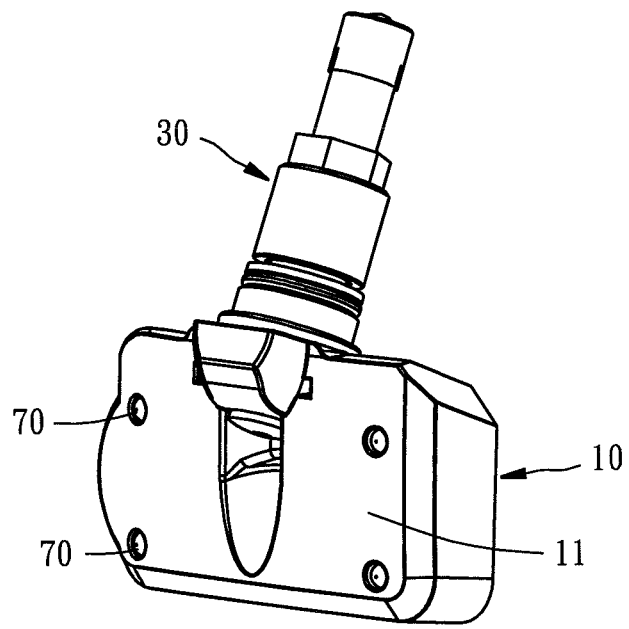
FIG. 8 is an oblique top elevational view of a terminal encapsulated tire monitoring device in accordance with a third embodiment of the present invention.
Figure 9:
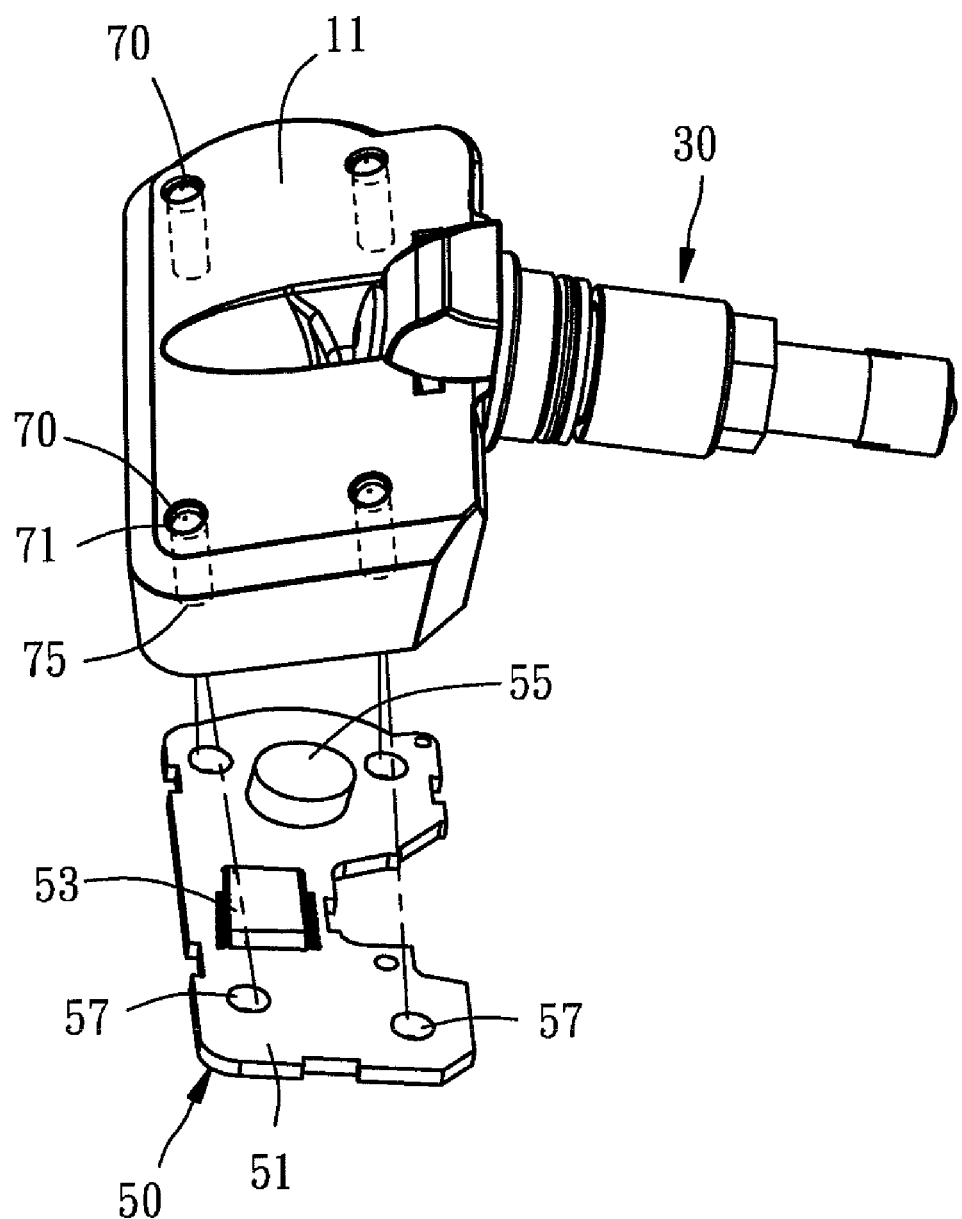
FIG. 9 is an exploded view of the terminal encapsulated tire monitoring device in accordance with the third embodiment of the present invention.
Figure 10:
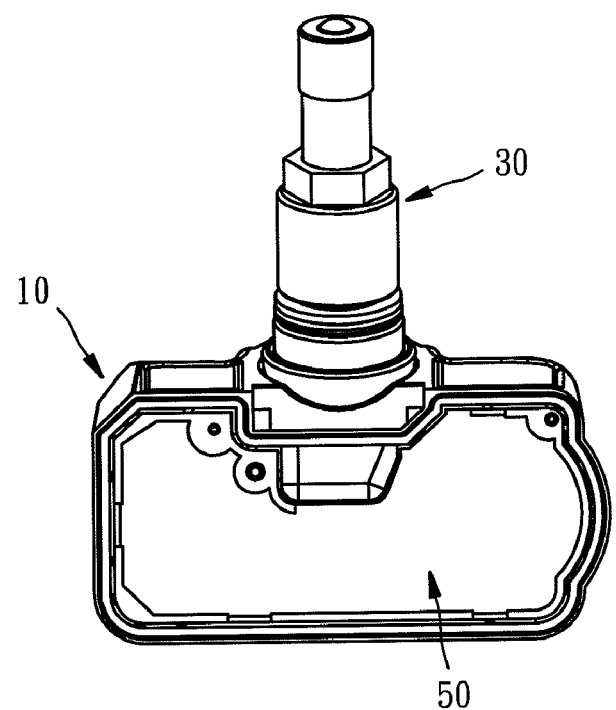
FIG. 10 is an oblique bottom elevational view of the terminal encapsulated tire monitoring device in accordance with the third embodiment of the present invention.

FIGS. 8~10 illustrate a terminal encapsulated tire monitoring device in accordance with a third embodiment of the present invention. Similar to the aforesaid first and second embodiments, the terminal encapsulated tire monitoring device in accordance with this third embodiment consists of a housing, an air valve 30, a sensor unit 50 and a set of conducting terminals 70. The main feature of this third embodiment is that the conducting terminals 70 are configured into a rod shape with the respective first contact ends 71 fixedly fastened to the top wall 11 of the housing. Further, the conducting terminals 70 arranged in four corners in the housing to enhance positioning of the sensor unit 50 in the housing. Alternatively, the conducting terminals 70 can be arranged in the housing to show a pattern like a loop or ring, or set in the housing in any other arrangement.

Figure 11:
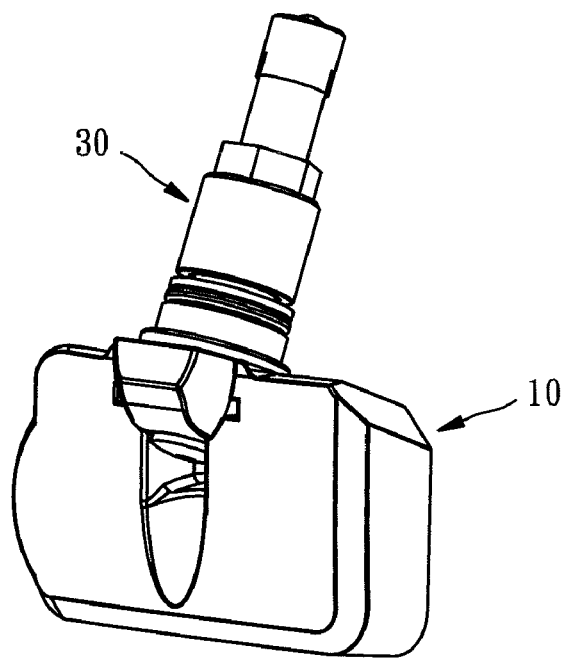
FIG. 11 is an oblique top elevational view of the terminal encapsulated tire monitoring device in accordance with a fourth embodiment of the present invention.
Figure 12:
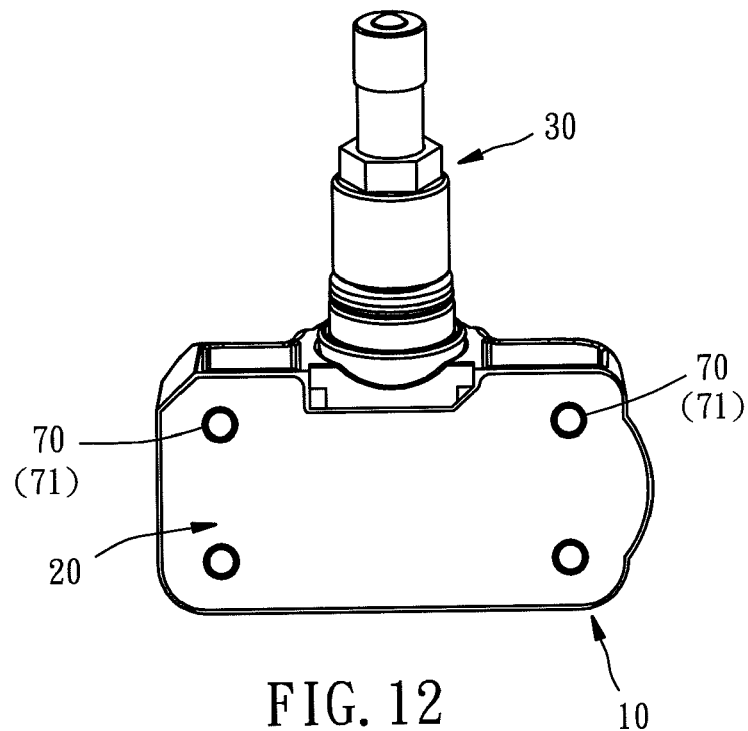
FIG. 12 is an oblique bottom elevational view of the terminal encapsulated tire monitoring device in accordance with a fourth embodiment of the present invention.
Figure 13:
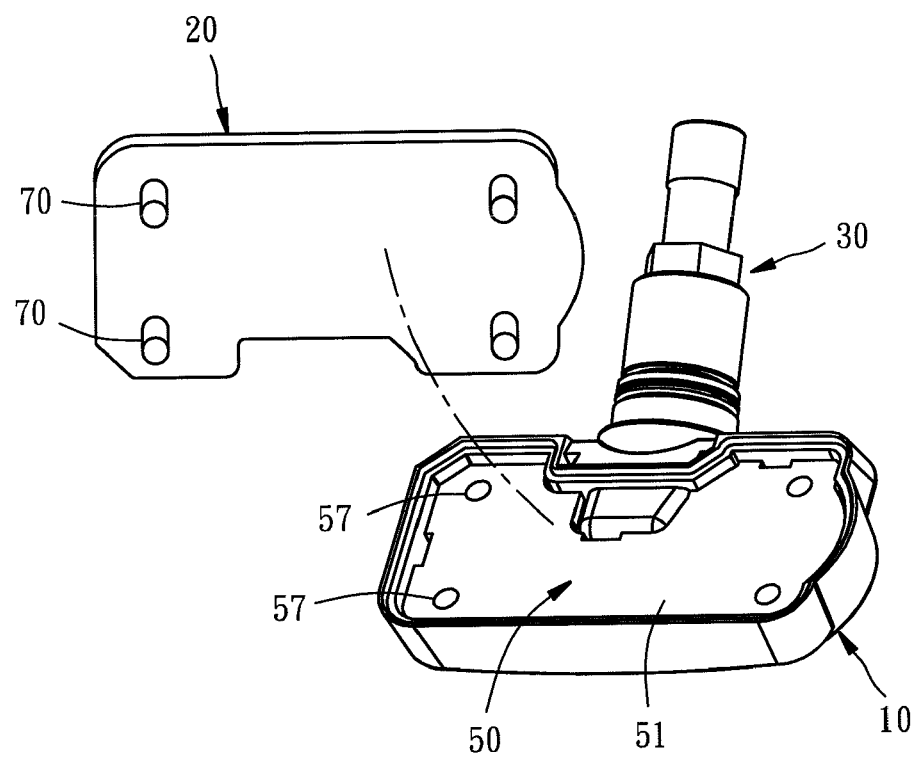
FIG. 13 is an exploded view of the terminal encapsulated tire monitoring device in accordance with the fourth embodiment of the present invention.

FIGS. 11~13 illustrate a terminal encapsulated tire monitoring device in accordance with a fourth embodiment of the present invention. Similar to the aforesaid first, second and third embodiments, the terminal encapsulated tire monitoring device in accordance with this fourth embodiment consists of a housing, an air valve 30, a sensor unit 50 and a set of conducting terminals 70. The main feature of this fourth embodiment is that the housing comprises a first shell member 10 and a second shell member 20; the conducting terminals 70 are embedded in the second shell member 20. The second shell member 20 of the housing of this fourth embodiment has a bottom wall 21. The conducting terminals 70 are embedded in the bottom wall 21 of the second shell member 20. The second shell member 20 with the conducting terminals 70 are then assembled with the first shell member 10.

It is to be understood that the housing in either of the aforesaid various embodiment can be formed of a first shell member 10 and a second shell member 20.

Except the aforesaid exemplars, the terminal encapsulated tire monitoring device can have other modifications or enhancement.

For example, except the technique of electrically soldering the second contact ends 75 of the conducting terminals 70 to the respective terminal connection portions 57 of the sensor unit 50, the second contact ends 75 of the conducting terminals 70 can be electrically connected to the respective terminal connection portions 57 of the sensor unit 50 by any of a variety of other conducting methods.

Further, except by directly connecting the conducting terminals 70 to the circuit board 51, the conducting terminals 70 can be electrically connected to the circuit board 51 by means of an adapter or cable.

Further, broadly speaking the terminal encapsulated tire monitoring device can be configured having at least one conducting terminal 70 to constitute the essential characteristics of the present invention. When a less number of conducting terminals are installed, the number of conducting items is relatively reduced; for example, can only writing in an encoding program, charging and/or one of various settings. Preferably, multiple conducting terminals 70 are provided for different settings or different purposes.

Further, the aforesaid air valve 30 is not a requisite element. The terminal encapsulated tire monitoring device can be configured without the aforesaid air valve 30 and directly installed in a vehicle tire or wheel rim, i.e., the terminal encapsulated tire monitoring device can be made simply comprising a housing, a sensor unit 50 and a set of conducting terminals 70.

Further, except the technique of partially embedding the conducting terminals 70 in the housing by means of injection molding, the conducting terminals 70 can be embedded in the housing by means of ultrasonic plastic welding or ultrasonic metal welding.

Further, except the aforesaid U-shape or rod shape, the conducting terminals 70 can be configured into a L-shape or any other configuration.

In conclusion, the terminal encapsulated tire monitoring device assures positive positioning of the conducting terminals with the housing and the circuit board, avoiding vibration loosening or contact failure. The component design is compact so that the housing can be small-sized or can provide extra accommodation space, facilitating fabrication and installation.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A terminal encapsulated tire monitoring device electrically connectable with at least one contact of a read-write tool, comprising:
   a housing;
   a sensor unit mounted in said housing, said sensor unit comprising a circuit board and a plurality of terminal connection portions;
   a plurality of conducting terminals partially embedded in said housing, each said conducting terminal having a first contact end electrically connectable by one contact of said read-write tool and a second contact end electrically connected to one said terminal connection portion of said sensor unit.

2. The terminal encapsulated tire monitoring device as claimed in claim 1, wherein said housing comprises a first shell member and a second shell member; said conducting terminals are embedded in said first shell member.

3. The terminal encapsulated tire monitoring device as claimed in claim 1, wherein said housing comprises a first shell member and a second shell member; said conducting terminals are embedded in said second shell member.

4. The terminal encapsulated tire monitoring device as claimed in claim 1, wherein said conducting terminals are embedded in at least one of a top wall, a peripheral wall, a corner edge and a bottom wall of said housing.

5. The terminal encapsulated tire monitoring device as claimed in claim 1, wherein said conducting terminals are arranged in a row.

6. The terminal encapsulated tire monitoring device as claimed in claim 1, wherein said conducting terminals are arranged in multiple rows.

7. The terminal encapsulated tire monitoring device as claimed in claim 1, wherein said conducting terminals are arranged in said housing to show a pattern like a loop or ring.

8. The terminal encapsulated tire monitoring device as claimed in claim 1, wherein said conducting terminals are configured into one of U-shape, rod shape and L-shape.

9. The terminal encapsulated tire monitoring device as claimed in claim 1, wherein said conducting terminals are embedded in said housing by means of one of the techniques of injection molding and welding.

10. The terminal encapsulated tire monitoring device as claimed in claim 1, wherein each said conducting terminal has a rough surface embedded in said housing.

* * * * *